(12) United States Patent
Daoud (10) Patent No.: US 6,463,728 B1
(45) Date of Patent: Oct. 15, 2002

(54) CABLE GUIDE

(75) Inventor: Bassel Daoud, Parsippany, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/644,617

(22) Filed: Aug. 23, 2000

(51) Int. Cl.⁷ .............................................. F16G 13/16
(52) U.S. Cl. ......................................... 59/78.1; 248/49
(58) Field of Search ........................... 59/78.1; 248/49, 248/51

(56) References Cited

U.S. PATENT DOCUMENTS

| | | | | |
|---|---|---|---|---|
| 4,852,342 A | * | 8/1989 | Hart | 59/78.1 |
| 5,027,595 A | * | 7/1991 | Hart | 59/78.1 |
| 5,108,350 A | * | 4/1992 | Szpakowski | 59/78.1 |
| 5,642,612 A | * | 7/1997 | Hughes | 59/78.1 |
| 5,778,656 A | * | 7/1998 | Hart | 59/78.1 |

FOREIGN PATENT DOCUMENTS

| | | | | |
|---|---|---|---|---|
| GB | 2214602 | * | 9/1989 | 59/78.1 |
| GB | 2214604 | * | 9/1989 | 59/78.1 |

* cited by examiner

*Primary Examiner*—David Jones
(74) *Attorney, Agent, or Firm*—Stroock & Stroock & Lavan LLP (57) ABSTRACT

A cable guide and trough device for preventing the over-bending of cables, fibers, and/or wires generally comprises a plurality of links each having a base and a pair of opposing sidewalls defining a passageway for guiding the cables. The links are connected at pivots located at the ends of the links to permit rotation of the links about an axis perpendicular to the base. This rotation is limited by the abutment of the respective sidewalls of adjacently connected links. Preferably, the sidewalls are bowed into the passageway so that a substantially smooth inner curve is achieved when the device is fully flexed.

26 Claims, 7 Drawing Sheets

CABLE GUIDE

FIELD OF THE INVENTION

The invention relates to an expandable fiber trough for protecting fibers and, in particular, to an expandable trough having a bend limiting feature.

BACKGROUND OF THE INVENTION

In the telecommunications industry, wires, including fiber optic cables, are often housed in and connected to shelves, cabinets or other storage articles. The fibers in the shelves are accessed by sliding the shelf out to expose the fiber connections. Because the shelves are movable, some slack is provided in the fibers to prevent them from being detached from the connectors housed in the shelf. However, this extra length of fiber can cause the fibers to become tangled and/or excessively bent when of the shelf is closed. Excessive bending can cause the fibers to become damaged or inoperative resulting in unnecessary expense and maintenance.

Therefore, there is a desire and need to provide an apparatus for preventing the tangling and excessive bending of fiber cables in such shelves.

SUMMARY OF THE INVENTION

The present invention overcomes shortcomings of the prior art. According to the present invention, a cable organizer and bend-limiting device generally comprises a plurality of links interconnected at pivots to permit the links to rotate about pivots and thus form a flexible trough or channel capable of being moved into and out of a variety of serpentine shapes and paths. Each of the links preferably include a passageway for retaining one or more cables. The passageway is preferably defined by a base, a first sidewall extending from a side of the base, and a second sidewall extending from an opposite side of the base. The rotation of the links about the pivots is limited to a distance between the respective first and second sidewalls of connected links, so as to limit the bending of the passageway. Consequently, the bending of the cable(s) retained therein is limited to a desired radius of curvature, and the trough-like shape formed by the interconnected links aids in keeping the fibers organized, untangled and securely maintained as the storage shelf is opened or closed.

According to a preferred embodiment of the present invention, the links are connected to one another through the engagement of male and female members, which extend from opposite ends of the links. Preferably, the links may be releasably snapped together so as to provide simple assembly and flexible length configuration. The connection forms a pivot about which each of the links can rotate relative to the other link to which it is connected. The rotation is preferably about an axis perpendicular to the base. The base, first sidewall, and second sidewall define a passageway or trough through which a cable or group of cables may be fed and retained to prevent over-bending, tangling, or pinching of the cables. As used herein, the term "cable" or "cables" refers to any cable, wire, conductor, fiber optic cable, and the like, or other flexible elongated structure or member needing to be organized in a manner described herein.

In a fully extended condition, the sidewalls of each of the links are spaced from the respective sidewalls of the adjacent link, thereby permitting the links to rotate about the pivot connections. The distance between the respective sidewalls determines the angle that the links can sweep before abutting one another and limiting the bend of the passageway. By decreasing or increasing this distance, the desired radius of curvature can be similarly decreased or increased. Moreover, the first and second sidewalls may be bowed into the passageway at a radius of curvature substantially equally to the desired radius of curvature of the bend-limiting device to further facilitate the bending of the passageway to a desired radius of curvature. As will become apparent from the teachings herein, any number of links may be connected depending on the particular application of the bend-limiting device.

Because the radius of curvature can be pre-determined to accommodate particular types of cables, the present invention advantageously prevents delicate cables and/or fibers from being over-bent during the opening and closing of cable shelves.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

BRIEF DESCRIPTION OF THE DRAWINGS

In the figures, which are not to scale, and which are merely illustrative, and wherein like reference numerals depict like elements throughout several views.

DETAILED DESCRIPTION OF THE PREFERRED EMBODIMENTS

With reference to FIGS. 1–6, there is shown a preferred embodiment of the present invention wherein a bend-limiting device 10 for limiting the bend of a cable (shown in FIG. 1A) generally comprises a plurality of links 20 interconnected at pivots 100, 100' to permit the links to rotate about the pivots 100, 100'. Each link 20 of the device 10 includes a passageway 22 for retaining the cable. The passageway 22 is defined by a base 24, a first sidewall 70 extending from a side 26 of base 24, and a second sidewall 80 extending from an opposite side 27 of base 24.

Figure 1:
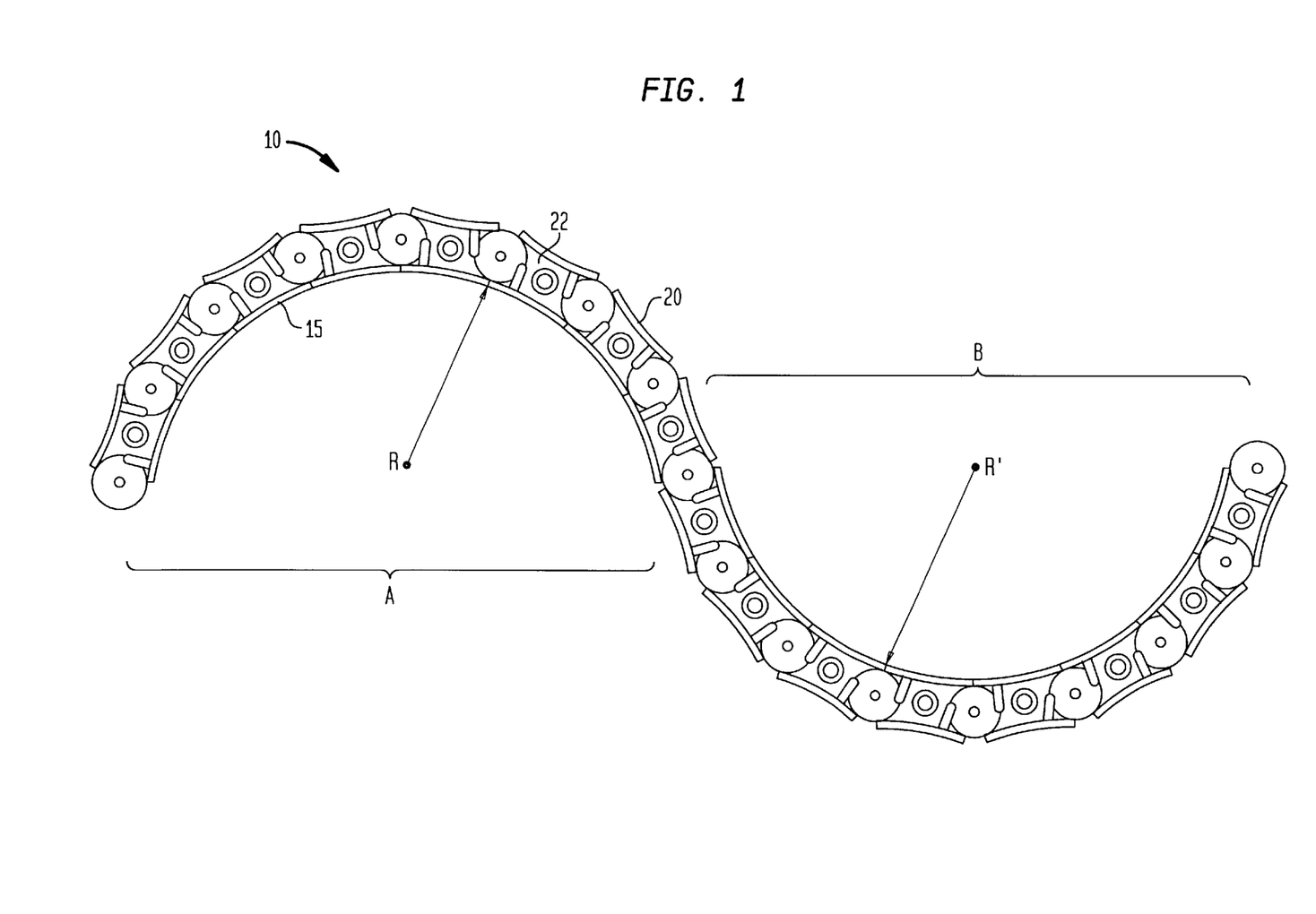
FIG. 1 is a top view of a bend limiting device in accordance with a preferred embodiment of the present invention.
Figure 1A:
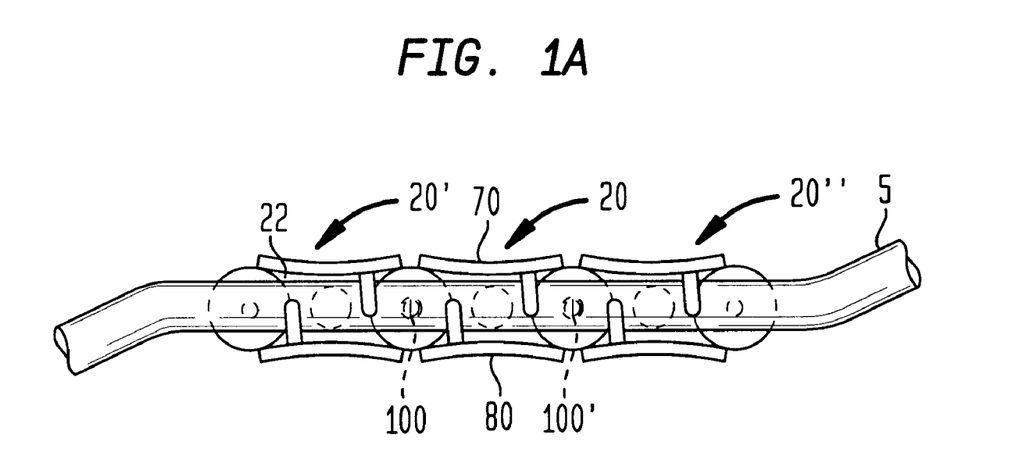
FIG. 1A is a top view of three links of a preferred embodiment of the device of FIG. 1, wherein the links are in an expanded condition with a cable shown carried therein.
Figure 2:
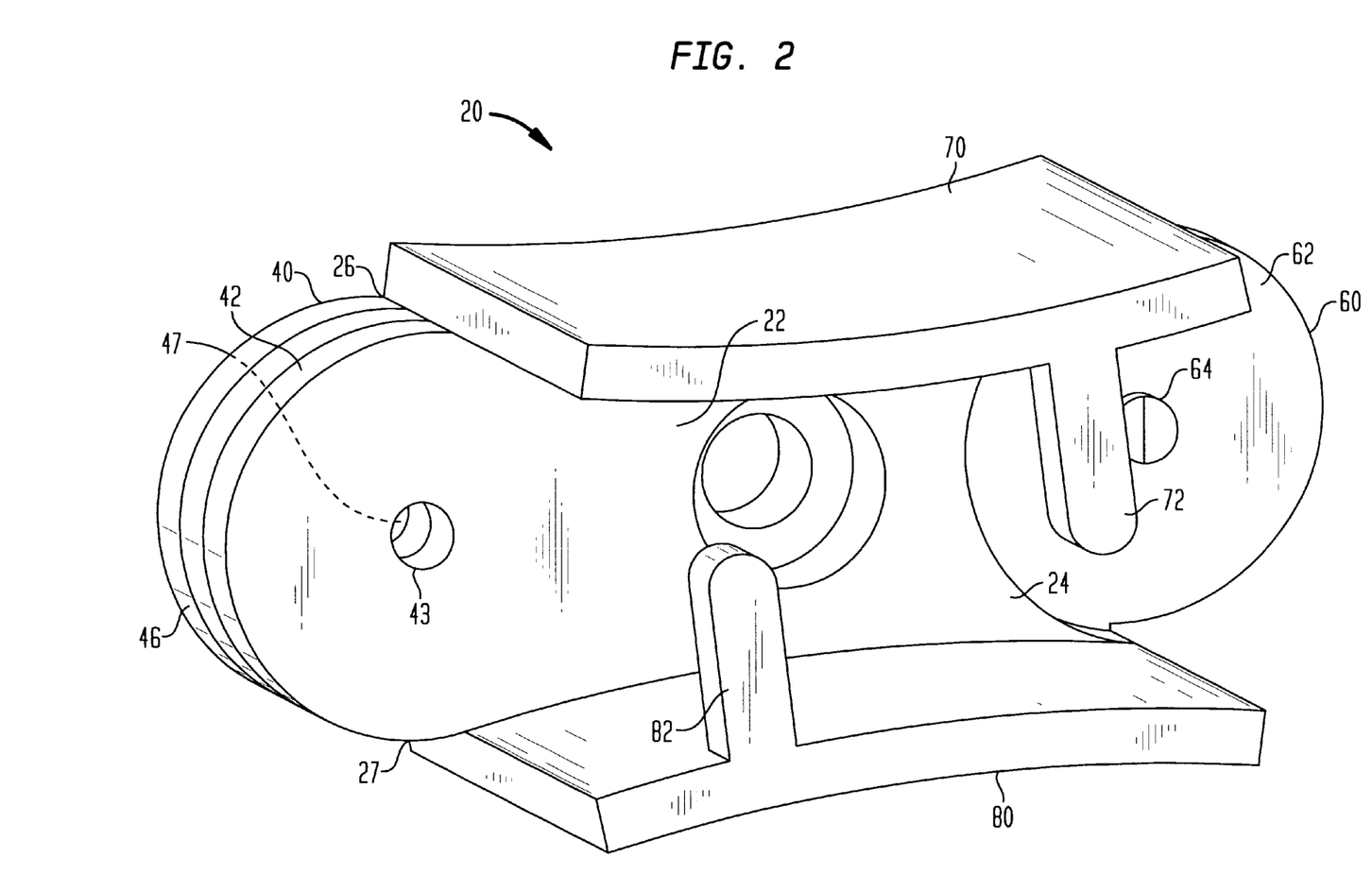
FIG. 2 is a top perspective view of a link for use with the device of FIG. 1.

Referring now to FIG. 1, there is shown a preferred embodiment of device 10 having a plurality of interconnected links 20. As depicted, a first and second section A and B, respectively, of device 10 are fully flexed to a desired radius of curvature R. With further reference to FIG. 2, each link 20 preferably includes at least first and second members 40 and 60 that extend from opposite ends 29, 30 of base 24. As will be further described, the first member 40 of each link 20 is connectable to the second member 60 of another link 20. When the links 20 are connected, as shown in FIG. 1A, the first and second sidewalls 70, 80 of each link 20 are separated from the first and second sidewalls 70, 80 of adjacent links 20' and 20". This separation permits the links 20 to rotate about pivots 100, 100' until the respective first sidewalls 70 or second sidewalls 80 (depending on the direction that device 10 is bent) contact one another, as shown in FIG. 1. The separation between the respective sidewalls of adjacent links is proportional to the amount of rotation of each link and, therefore, proportional to the total radius of curvature of device 10 when it is fully flexed. As such, an advantage of the present invention is that a desired radius of curvature R can be determined and designed into device 10 to prevent over-bending of particular types of cables guided by passageway 22.

With further reference to FIG. 1A, there is shown a cable 5 fed through passageway 22 of a preferred embodiment of the present invention. One skilled in the art will recognize from the teachings herein that cable 5 may be a single cable of varying thickness or a bundle of cables or a group of individual cables (or fibers). In addition, any elongate members or bundle of elongate members may be fed and guided through the present invention.

With reference now to FIG. 2, there is shown in detail a preferred embodiment of a link 20 for use with the present invention. As depicted, the first and second sidewalls 70, 80 are preferably, but not necessarily bowed inwardly into passageway 22. Preferably, the first and second side walls 70, 80 are bowed at a radius of curvature substantially equal to the desired radius of curvature R. When the radius of the bowing is substantially equal to the desired radius of curvature R, the sidewalls 70 or 80 (depending on the direction device 10 is flexed) will abut one another so as to form a substantially smooth inner edge 15 (shown in FIG. 1). One skilled in the art will recognize from the teachings herein, however, that the degree to which sidewalls 70, 80 are bowed is a matter of design choice and that the sidewalls need not be bowed at all for the invention to function. Preferably, the links are made of a plastic, non-conductive material and molded for manufacturing efficiencies, however those of skill in the art will recognize from the teachings herein that the links can be made of any suitable material on a matter of design choice, and sized and shaped as a matter of application specific need.

Figure 3:
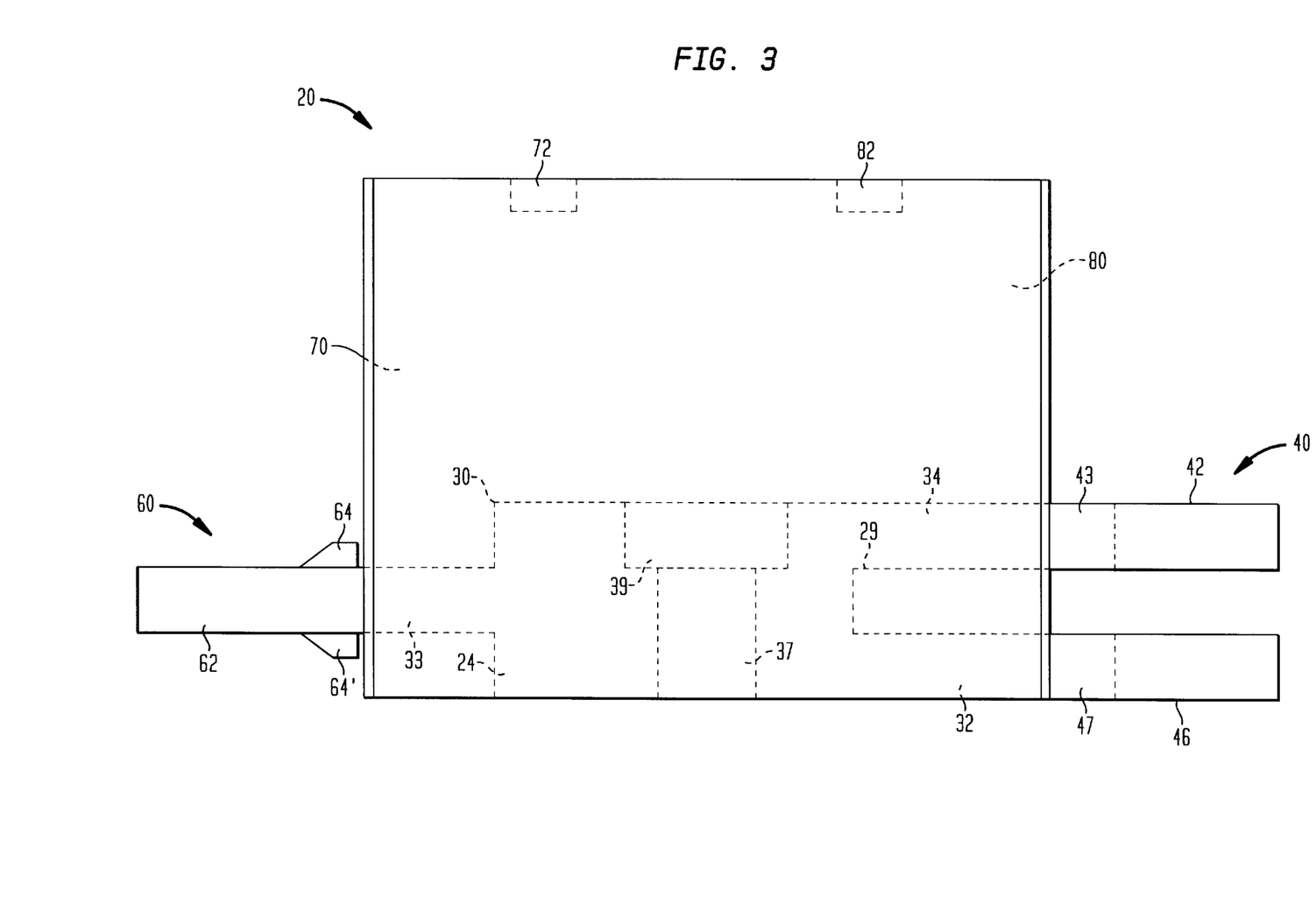
FIG. 3 is a side view of a link for use with the device in FIG. 1.

Referring now to FIGS. 2 and 3, a preferred embodiment of link 20 is shown. In this preferred embodiment, the base 24 has three levels 32, 33, 34 from which the first and second members 40 and 60 extend. One skilled in the art will recognize that although first and second members 40 and 60 need to be connectable (i.e., male/female engagement), the particular way of achieving such connection is not critical to the present invention, provided that the links can be matingly pivotably assembled to perform the features and functions described herein. In a preferred embodiment, for example, the first member 40 includes a pair of opposing portions 42 and 46, which extend from the first and third levels 32 and 34, respectively. Opposing portions 42, 46 preferably have semicircular edges to facilitate the rotation of the links 20. Each portion 42, 46 also has an aperture 43 and 47 formed therethrough. Preferably, the apertures 43, 47 are positioned relative to ends 29, 30 of base 24, such that the resulting pivots 100, 100' formed upon linkage of adjacent links separate the sidewalls of connected links, as described above.

Figure 4:
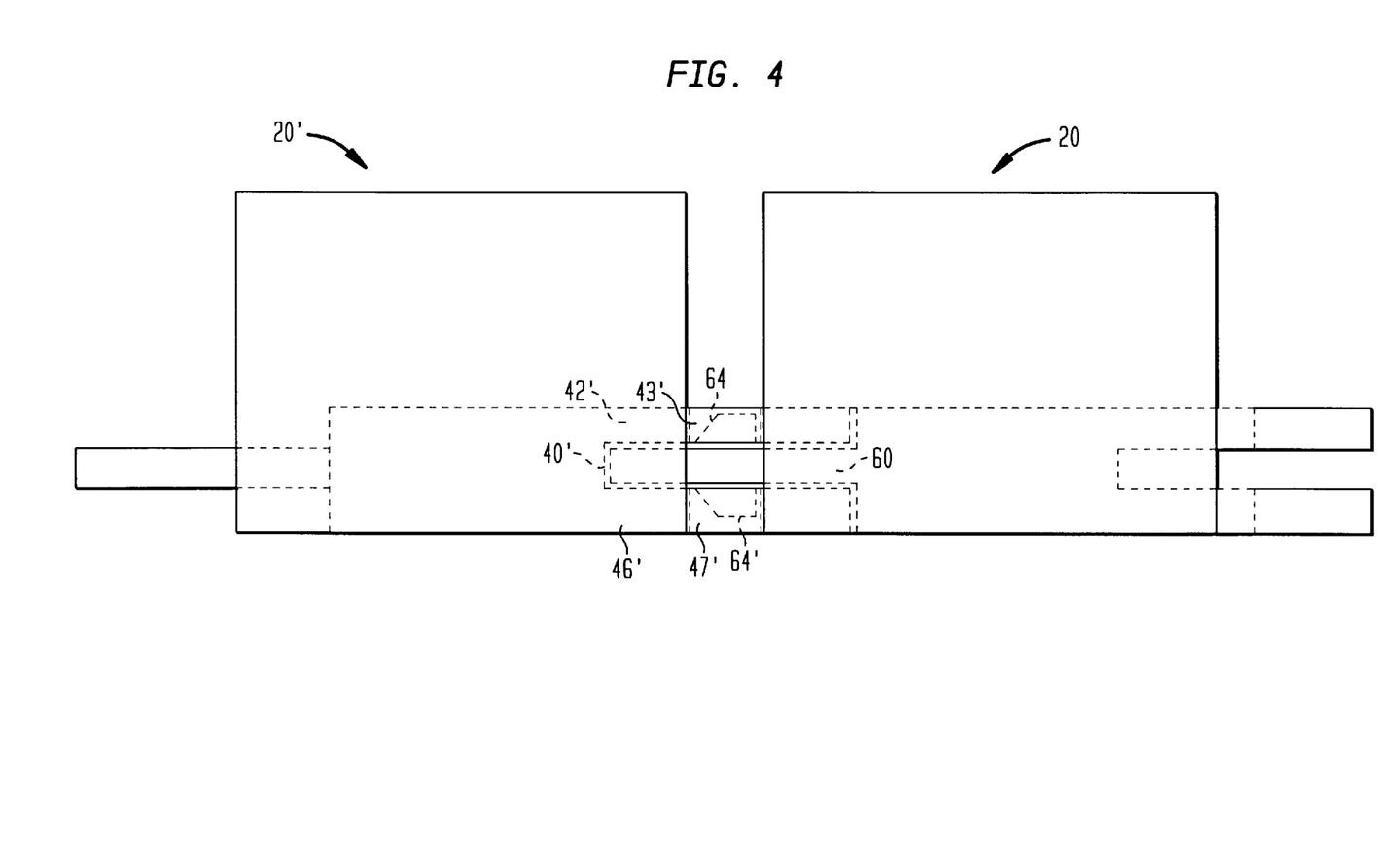
FIG. 4 is a side view of a pair of interconnected links for use with the device in FIG. 1.

The second member 60, includes at least one portion 62, which extends from the second level 33 of the base 24 and, is located at end 30. Like opposing portions 42 and 46, portion 62 also preferably has a semicircular edge. A pair of protrusions 64, 64' are formed on opposite surfaces of portion 62. Thus, as depicted in FIG. 4, the protrusions 64, 64' of the second member 60 of link 20 engage the apertures 43' and 47' of the first and third portions 42', 46' of the first member 40' of a second link 20' in a snap fit mating engagement. Once connected, the links can rotate about the resulting pivot 100.

Referring again to FIGS. 1–3, in a preferred embodiment of the present invention, one or more fingers for retaining a cable within passageway 22 is preferably provided on each link 20. A first finger 72 extends from the first sidewall 70 into and over the passageway 22. The first finger 72 is preferably positioned near one of the ends of link 20. A second oppositely facing finger 82 extends from the second sidewall 80 into and over passageway 22. The second finger 82 is preferably positioned near an end of link 20 opposite from the end near which the first finger 72 is positioned. In use, a cable (not shown) can be fed around the fingers 72, 82 and into passageway 22. Because the fingers 72, 82 extend over the passageway 22, the cable is retained in passageway 22 by the fingers. It should be noted that although it is preferable to provide fingers 72 and 82, the cable can be retained in passageway 22 by any other means known in the art. For example the side walls can be ribbed or retainers positioned across passageway 22.

As is shown in detail in FIGS. 2 and 3, in a preferred embodiment of the present invention each link 20 is provided with screw hole 37 to facilitate the fixed mounting of one or more links to a support structure. Screw hole 37 is formed through base 24 and includes a recess 39 for receiving the head of a screw (not shown), such that the screw head sits flush with the surface of the third level 34 of base 24. Any art recognized mounting methodology, however, may be used to secure a link to a support structure.

Figure 5:
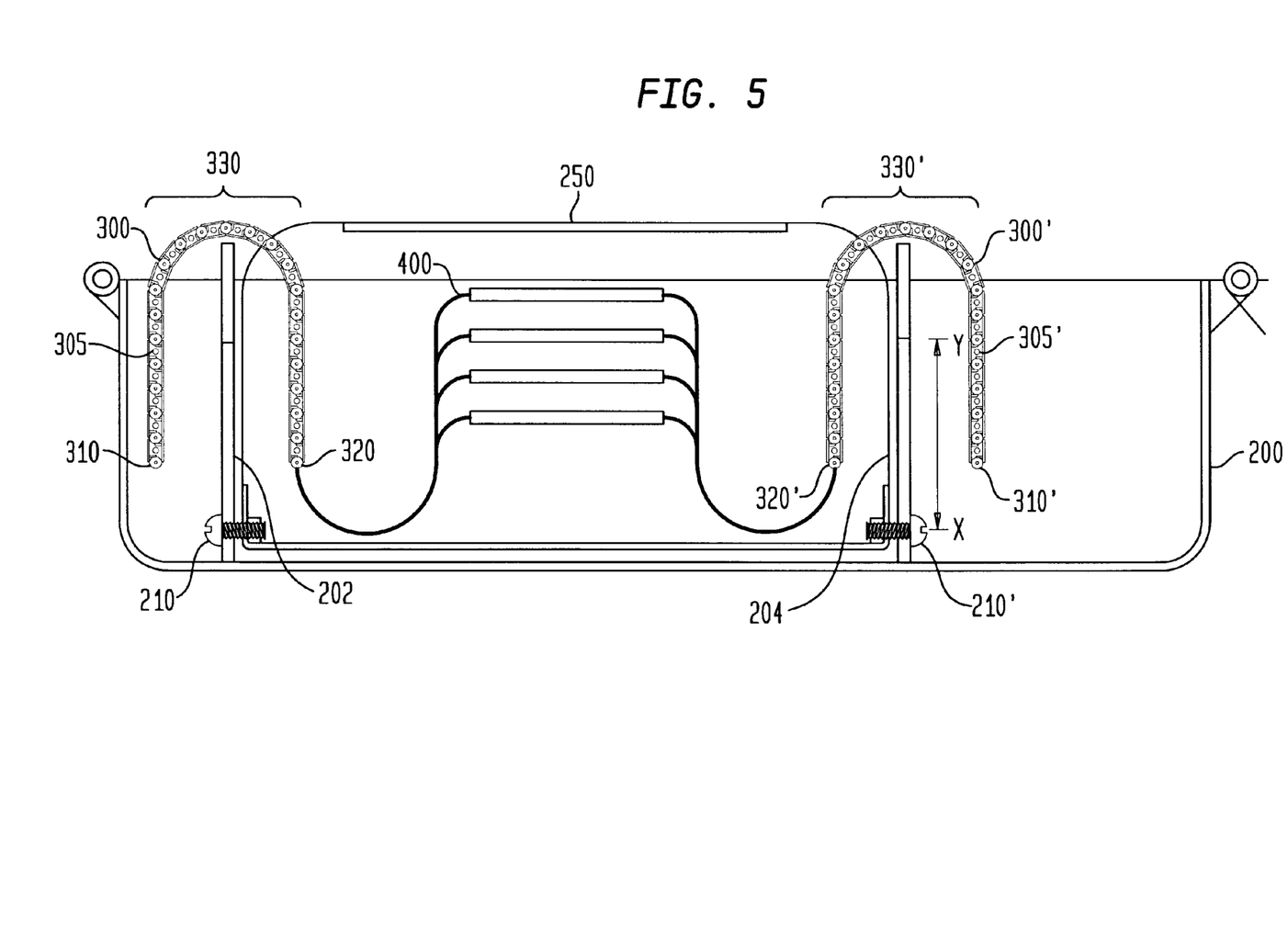
FIG. 5 is a top view of a shelf fitted with the device of FIG. 1, wherein the device is in a flexed condition.
Figure 6:
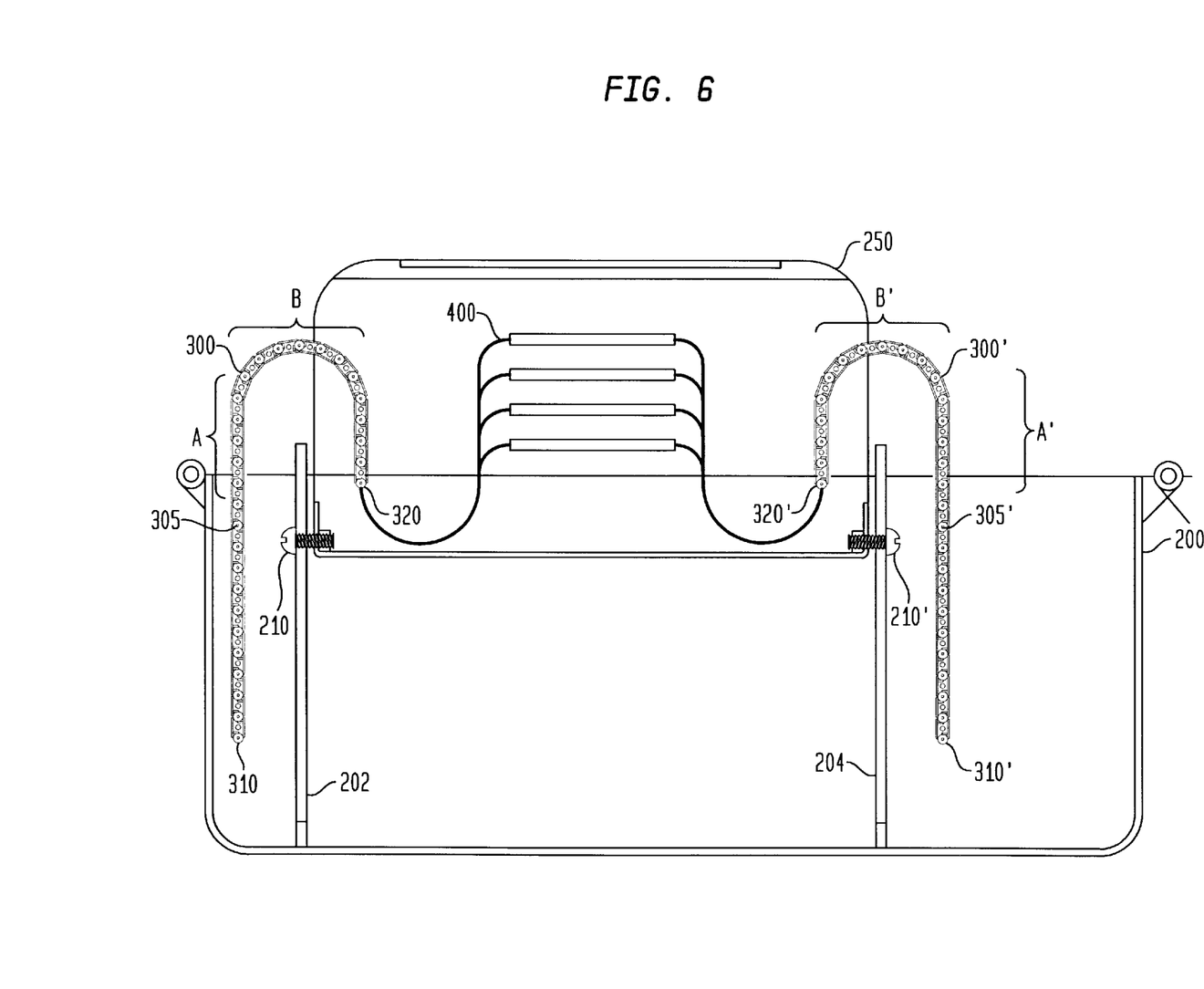
FIG. 6 is a top view of the shelf and device of FIG. 5, wherein the shelf is opened and the device is in an expanded condition.

With reference to FIGS. 5 and 6, an example of one illustrative use of a preferred embodiment of the present invention will now be described. A preferred embodiment of the present invention may be advantageously deployed with a fiber optic cable shelf, tray or other moveable object upon which cables are mounted, connected or fed, the shelf being slidably housed in a cabinet 200 or other similar art recognized housing or structure. Shelf 250, by way of non-limiting example, is slidably mounted to cabinet 200 by way of a pair of screws 210, 210' that pass through a first and second sidewall 202 and 204, respectively, of cabinet 200. The sidewalls 202 and 204 are each constructed to permit screws 210, 210' to slide between points X and Y, thereby permitting shelf 250 to be slidably opened and closed. One skilled in the art will recognize that although a preferred embodiment of the present invention is shown, shelf 250 may be slidably mounted in cabinet 200 in any manner known in the art. As previously described, fiber optic cables may be terminated or connected to such shelves in any art recognized manner, such as for example, as shown in FIGS. 5 and 6.

As depicted in FIG. 5, shelf 250 is shown in a closed position. Bend-limiting device 300, 300' is fixed to cabinet 200 at end 310, 310'. Similarly, bend-limiting device 300, 300' is fixed to shelf 250 at end 320, 320'. The cables 400 housed within shelf 250 are fed into the passageway 305, 305' of the bend-limiting devices 300, 300' at ends 320, 320'. In this example, a portion 330, 330' of device 300, 300' is pre-flexed to the desired radius of curvature R to permit the device (and the cables) to pass around the sidewalls 202 and 204 of cabinet 200 and out of cabinet 200.

To access the cables 400, shelf 250 is slid outwardly from cabinet 200. As depicted in FIG. 6, ends 320, 320' move outwardly with the shelf 250 as it is opened, while ends 310, 310' remain fixed to cabinet 200. As the shelf 250 is opened, a portion of the devices 300, 300' straighten (sections A, A'), while another portion flexes (section B, B') to accommodate the outward movement of the shelf 250. Consequently, as shelf 250 is closed and opened, the bendlimiting device 300, 300' guides the retained cables and prevents the cables from becoming pinched or over-bent. Numerous shapes can be assumed by the device depending on how the individual links are sized shaped relative to each other.

One skilled in the art will recognize that the bend-limiting device disclosed herein is not limited to the uses described herein, but may be used in applications pertaining to any field where there is a need to retain cables or other elongate flexible members and/or to limit the bending to which the cables are subjected.

With reference to the various figures and embodiments of the present invention, it should be noted that the bend limiting feature of the present invention need not be limited to the abutment of the sidewalls 70 and 80. Rather, link 20 may be provided with a limiting member, such as, by way of non-limiting example, a tab extending from the base 24 or a projection formed on protrusions 64, 64' (not shown), or some other protrusion or surface feature may be provided on the link to limit the extent of bending of the cable guide. Furthermore, one skilled in the art will recognize that sidewalls 70 and 80 need not be solid or continuous, so long as the sidewalls 70 and 80 are sufficient to retain the cables within passageway 22.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

I claim:

1. A cable guide, comprising:
    a plurality of interconnectable links each interconnected at a pivot to permit pivotal movement of the links relative to each other, each link comprising:
        a passageway defined by a base, a first sidewall extending from a side of the base, and a second sidewall extending from an opposite side of the base, wherein at least one of the first and second sidewalls is curved;
        a pivot connector for forming said pivot via a shape mating pivotal engagement with an adjacent link of said plurality, wherein rotation of the links about the pivots is limited, so as to limit an extent of bending of the cable guide to a desired radius of curvature; and
        wherein rotation is limited by abutment of edges of the respective first and second sidewalls of connected links.

2. The cable guide of claim 1, wherein the first and second sidewalls of each of the links are bowed into the passageway.

3. The cable guide of claim 2, wherein the first and second sidewalls of each of the links are bowed at a radius of curvature substantially equal to the desired radius of curvature.

4. The cable guide of claim 1, wherein each of the links has a first member extending from a first end of the base and a second member extending from a second end of the base, each link being interconnectable through the mating engagement of the first member with the second member.

5. The cable guide of claim 4, wherein the first member further comprises a pair of opposing portions, each portion having an aperture and the second member has a pair of protrusions formed on opposite surfaces of the second member, such that when the protrusions of the second member of one of the links are urged between the opposing portions of another link, the protrusions engage the apertures.

6. A cable guide, comprising:
    a plurality of interconnectable links each interconnected at a pivot to permit pivotal movement of the links relative to each other, each link comprising:
        a passageway defined by a base, a first sidewall extending from a side of the base, and a second sidewall extending from an opposite side of the base, wherein at least one of the first and second sidewalls is curved;
        a pivot connector for forming said pivot via a shape mating pivotal engagement with an adjacent link of said plurality; and
        a first finger extending from the first sidewall over the passageway.

7. The cable guide of claim 6, further comprising a second finger extending from the second side wall into the passageway.

8. The cable guide of claim 7, wherein the first finger is positioned closer to a first end of the link and the second finger is positioned closer to a second end of the link.

9. A structure for housing cables, comprising:
    a mounting surface wall;
    a shelf movably mounted within said structure;
    at least one device fixed to the mounting surface wall at one end and fixed to the shelf at the other end, the device having a passageway for retaining the cables, the passageway being bendable to a desired radius of curvature; and
    wherein at least a portion of the device has a limited range of motion as the shelf moves between an open and closed position so as to limit the bending of the cables retained in the device to the desired radius of curvature.

10. A method of preventing damage to cables housed in a movable shelf mounted in a cabinet, comprising:
    fixing a cable guide including a passageway for retaining the cables to the shelf and cabinet, the cable guide including a plurality of interconnectable links defining the passageway, each link having a pivotal connection to an adjacent link of said plurality, the links being sized and shaped to limit an extent of bending of the cable guide; and
    feeding at least one cable into the passageway.

11. A flexible, length adjustable trough, comprising:
    a plurality of links, each link of said plurality sized and shaped for pivotable, detachable mating engagement with at least one other link of said plurality; and
    each link further comprising a base, a side member upstanding from said base, said side member being curved, and an open section opposite said base, said plurality of links, when matingly engaged, forming a flexible trough having a longitudinal axis, said trough being sufficiently flexible to permit said trough to assume a serpentine shape along a reference plane of motion while being substantially inflexible in planes of motion out of said reference plane.

12. The trough of claim 11, wherein the flexibility of the trough is limited, so as to limit the flexibility of the trough to a desired radius of curvature.

13. The trough of claim 12, wherein the flexibility of the trough is limited by abutment of edges of the respective side members of connected links.

14. The trough of claim 11, wherein the side members of each of the links are bowed into the open section.

15. The trough of claim 11, further comprising a finger extending from the side member over the open section.

16. A link of a cable guide, comprising:
   a passageway defined by a base, a first sidewall extending from a side of the base and a second sidewall extending from an opposite side of the base wherein the first and second sidewalls of the link is bowed into the passageway; and
   a pivot connector for forming a pivotal connection via shape mating pivotal engagement with a link of similar construction.

17. The link of claim 16, wherein said link is so sized and shaped as to limit an extent of bending of said cable guide to a desired radius of curvature.

18. The link of claim 16, wherein the first and second sidewalls of the link are bowed at a radius of curvature substantially equal to the desired radius of curvature.

19. The link of claim 16, wherein the link has a first member extending from a first end of the base and a second member extending from a second end of the base, and the links are interconnected through the mating engagement of the first member with the second member.

20. The link of claim 19, wherein the first member further comprises are pair of opposing portions, each portion having an aperture and the second member has a pair of protrusions formed on opposite surfaces of the second member, such that when the protrusions of the second member of the link are urged between the opposing portions of a second link, the protrusions engage the apertures.

21. A link of a cable guide, comprising:
   a passageway defined by a base, a first sidewall extending from a side of the base and a second sidewall extending from an opposite side of the base wherein the first and second sidewalls of the link is bowed into the passageway;
   a pivot connector for forming a pivotal connection via shape mating pivotal engagement with a link of similar construction; and
   a first finger extending from the first sidewall over the passageway.

22. The link of claim 21, further comprising a second finger extending from the second side wall over the passageway.

23. The link of claim 22, wherein the first finger is positioned closer to a first end of the link and the second finger is positioned closer to a second end of the link.

24. A method of making a link of a cable guide, the method comprising:
   forming a passageway defined by a base and a pair of side walls upstanding from said base;
   forming a pair of pivotal connectors at each end of the link for permitting the shape mating pivotal engagement of the pivotal connectors of adjacent links of the cable guide; and
   shaping each of the sidewalls of the link to include a concave bow so as to limit an extent of bending of the cable guide.

25. A cable guide, comprising:
   a plurality of interconnectable links each interconnected at a pivot to permit pivotal movement of the links relative to each other, each link comprising:
   a passageway defined by a base, a first sidewall extending from a side of the base, and a second sidewall extending from an opposite side of the base; and
   a pivot connector for forming said pivot via a shape mating pivotal engagement with an adjacent link of said plurality, wherein the first and second sidewalls of each of the links are bowed into the passageway.

26. The cable guide of claim 25, wherein the first and second sidewalls of each of the links are bowed at a radius of curvature substantially equal to the desired radius of curvature.

* * * * *